United States Patent [19]

Gould

[11] Patent Number: 5,358,625
[45] Date of Patent: Oct. 25, 1994

[54] LUBRICATING OIL DEWAXING USING MEMBRANE SEPARATION OF COLD SOLVENT FROM DEWAXED OIL

[75] Inventor: Ronald M. Gould, Sewell, N.J.

[73] Assignee: Mobile Oil Corporation, Fairfax, Va.

[21] Appl. No.: 52,326

[22] Filed: Apr. 23, 1993

[51] Int. Cl.⁵ .................. C10G 73/06; C10G 73/32; B01D 39/00; C07C 7/144
[52] U.S. Cl. ........................ 208/31; 208/37; 208/38; 585/818; 585/819; 210/500.39; 210/654
[58] Field of Search ............... 208/31, 37, 38; 585/818, 819; 210/500.39, 650, 651, 654

[56] References Cited

U.S. PATENT DOCUMENTS

| | | | |
|---|---|---|---|
| 4,368,112 | 1/1983 | Thompson et al. | 208/31 |
| 4,432,866 | 2/1984 | West et al. | 208/321 |
| 4,532,041 | 7/1985 | Shuey et al. | 210/500.2 |
| 4,670,151 | 6/1987 | Bitter | 210/641 |
| 4,836,927 | 6/1989 | Wan | 210/651 |
| 4,963,303 | 10/1990 | Anderson | 264/41 |
| 4,985,138 | 1/1991 | Pasternak | 208/308 |
| 5,042,992 | 8/1991 | Blinka et al. | 55/16 |
| 5,067,970 | 11/1991 | Wang et al. | 55/16 |

OTHER PUBLICATIONS

McCabe, et al., Unit Operations of Chemical Engineering, McGraw-Hill, Inc. 1967, pp. 880-883.

*Primary Examiner*—Paul Lieberman
*Assistant Examiner*—Patricia L. Hailey
*Attorney, Agent, or Firm*—Alexander J. McKillop; Malcolm D. Keen; L. Gene Wise

[57] ABSTRACT

A process for solvent dewaxing a waxy oil feed to produce a lubricating oil by contacting a warm waxy oil feed in counter-current with a cold oil/solvent filtrate stream through a selectively permeable membrane to transfer cold solvent through the membrane to the feed and simultaneously cool the feed, dilute it with solvent and separate solvent from the cold oil/solvent filtrate stream. The cooled, diluted feed stream is then further cooled to precipitate the wax to form an oil/solvent/wax mixture which is further diluted with cold solvent and filtered to remove wax. The cold oil/solvent filtrate stream is cycled to the selectively permeable membrane for the counter-current contact with the warm waxy oil feed and, after removal of a portion of the solvent over the membrane, is sent to an oil/solvent separation operation in which the solvent is removed from the dewaxed oil.

10 Claims, 1 Drawing Sheet

LUBRICATING OIL DEWAXING USING MEMBRANE SEPARATION OF COLD SOLVENT FROM DEWAXED OIL

FIELD OF THE INVENTION

The present invention is directed to a process for dewaxing waxy oil feeds.

The present invention is particularly directed to a process for dewaxing waxy petroleum oil fractions.

The present invention is specifically directed to a process for the solvent dewaxing of waxy petroleum oil feeds to obtain lubricating oil stocks by countercurrently contacting a warm waxy oil feed on one side of a selective permeable membrane with a cold oil/solvent filtrate stream on the other side of the membrane to selectively transfer cold solvent from the oil/solvent filtrate stream through the membrane to the waxy oil feed.

The transfer of the cold solvent to the warm waxy oil feed simultaneously cools the warm waxy oil feed, dilutes the warm waxy oil feed with solvent and separates the solvent from the cold oil/solvent filtrate stream.

In solvent lube dewaxing, solvent is typically added to a warm waxy raffinate to control crystallization of the wax in the feed. Chilling of the feed is accomplished by indirect heat exchange against cold filtrate from the dewaxing filters and with refrigerant. Solvent is usually recovered from the filtrate by a combination of heating, multi-stage flash, and distillation operations. The hot solvent so recovered is then chilled again to the desired temperature for recycling to the wax filter feed.

PRIOR ART

In a typical solvent dewaxing process a waxy oil feed is mixed with solvent from a solvent recovery system. The waxy oil feed/solvent mixture is cooled by indirect heat exchange in a scraped-surface, double pipe heat exchanger against cold filtrate, which is a mixture of oil and solvent recovered from a filter used to separate wax from a wax containing stream. The cold filtrate is a mixture of oil and solvent. The cooled feed mix is injected with additional cold solvent from the solvent recovery system. The resultant mixture is further cooled against vaporizing propane, ammonia, or other refrigerant gas in a second scraped-surface double pipe exchanger. The chilled feed slurry is mixed with more chilled solvent from the solvent recovery system to obtain a filter feed.

The amount of circulating solvent is limited by the capacities of the solvent recovery sections and the capacity of the refrigeration system used to cool the recovered solvent to the desired injection temperatures. These limitations on the solvent availability can restrict the feed rate to the filter since the filter feed (high viscosity oil plus low viscosity solvent) must have a sufficiently low viscosity to achieve an acceptable filtration rate.

The cold filtrate is sent to an oil recovery section where solvent is removed from the oil by the addition of heat, followed by a combination of multi-stage flash and distillation operations. The separated solvent is warm and must be cooled prior to recycle to the dewaxing process.

At present, dewaxing of waxy feed is performed by mixing the feed with a solvent to completely dissolve the waxy feed at a suitable elevated temperature. The mixture is gradually cooled to an appropriate temperature required for the precipitation of the wax and the wax is separated on a rotary filter drum. The dewaxed oil is obtained by evaporation of the solvent and is useful as a lubricating oil of low pour point.

The dewaxing apparatus is expensive and complicated. In many instances the filtration proceeds slowly and represents a bottleneck in the process because of low filtration rates caused by the high viscosity of the oil/solvent/wax slurry feed to the filter. The high viscosity of the feed to the filter is due to a low supply of available solvent to be injected into the feed stream to the filter. In some cases, lack of sufficient solvent can result in poor wax crystallization and ultimately lower lube oil recovery.

The use of solvents to facilitate wax removal from lubricants is energy intensive due to the requirement for separating from the dewaxed oil and recovery of the expensive solvents for recycle in the dewaxing process.

The solvent is conventionally separated from the dewaxed oil by heating and distillation. The separated solvent must then be cooled and condensed and further cooled to the dewaxing temperature prior to recycle to the process.

The heating of the dewaxed oil and solvent for the recovery of the solvent and subsequent cooling of the solvent require substantial energy inputs.

The most limiting factors in the solvent dewaxing process are the cost and size of the filters, the cost, size and operating expense of the distillation equipment needed to separate the solvent from the dewaxed oil and the cooling apparatus and cooling capacity required to cool the warm solvent separated from the dewaxed oil.

The filter capacity could be increased if there were available more solvent by simply further diluting the oil/solvent/wax mixture feed to the filter to lower the viscosity of the feed.

However, increasing the amount of solvent available to dilute the feed to the filter requires increasing the means of separating solvent from dewaxed oil and increasing the cooling capacity to cool the separated warm solvent prior to recycle.

The problems to be solved were to increase the amount of solvent available to the solvent dewaxing process without increasing the overall solvent inventory and without increasing the size and capacity of the oil/solvent recovery distillation system and the refrigeration capacity required to cool the warm solvent separated by distillation.

An additional problem to be solved was to increase the filtration capacity of the process without providing additional filtration apparatus and without increasing the solvent inventory.

OBJECT OF THE INVENTION

It is an object of the present invention to increase the amount of dewaxing solvent available to the dewaxing process by increasing the rate of recycle of the solvent to the process.

It is another object of the present invention to increase the amount of dewaxing solvent available to the dewaxing process without increasing the distillation capacity of the oil/solvent recovery system and without increasing the refrigeration capacity required to cool to the dewaxing temperature warm solvent recycled from the oil/solvent recovery system to the dewaxing process.

It is another object of the present invention to utilize a selective permeable membrane to countercurrently contact cold filtrate from the filter with warm waxy oil feed to selectively transfer the cold solvent through the membrane into direct contact with the warm waxy feed to simultaneously remove the cold solvent from the filtrate and to cool the waxy oil feed to about its cloud point temperature.

It is another object of the present invention to increase the oil/solvent/wax slurry filtration rate by decreasing the viscosity of the oil/solvent/wax slurry feed to the filter.

SUMMARY OF THE INVENTION

The present invention is directed to a process for solvent dewaxing a waxy oil feed to obtain petroleum oil lubricating stock.

The waxy oil feed is sequentially indirectly contacted with cold filtrate and refrigerant which reduce the temperature of the oil to crystallize and precipitate the wax constituents of the oil and is then directly contacted with cold solvent to obtain an oil/solvent/wax mixture. The directly added cold solvent also serves to dilute the oil/solvent/wax mixture in order to maintain a sufficiently low viscosity of the mixture such that the mixture, when fed to a filter, is readily separated into a wax/solvent slurry and a cold dewaxed oil/solvent filtrate stream.

The total amount of solvent added to the waxy oil feed, i.e. the solvent oil ratio used, and the temperature to which the waxy oil feed is cooled are determined by the boiling range of the feed, the wax content of the feed and the desired pour point of the dewaxed lubricating oil.

The process includes countercurrently contacting a warm waxy oil feed on one side of a selective permeable membrane with a cold oil/solvent filtrate stream on the other side of the membrane and selectively transferring the cold solvent through the membrane to the warm waxy oil feed.

In order to increase the rate of solvent transfer through the membrane to the warm waxy oil feed, the oil/solvent filtrate stream side of the membrane is maintained at a positive pressure relative to the waxy oil feed side of the membrane.

The transfer of the cold solvent to the warm waxy oil feed simultaneously cools the warm waxy oil feed, dilutes the warm waxy oil feed with solvent and separates the transferred solvent from the cold oil/solvent filtrate stream.

The waxy oil feed, after cooling and dilution, is further cooled in a heat exchanger by indirect heat exchange with cold filtrate to crystallize and precipitate the wax in the oil feed to form an oil/solvent/wax mixture. The oil/solvent/wax mixture is further cooled in a heat exchanger by indirect heat exchange with a cold refrigerant. The cold oil/solvent/wax mixture is further diluted with cold solvent to adjust the viscosity of the mixture and the mixture is fed to a filter which filters and removes the precipitated wax from the cold oil/solvent/wax mixture. A cold wax/solvent slurry is recovered and a cold dewaxed oil/solvent filtrate stream is recovered.

The wax/solvent slurry is treated to recover a wax cake which can be further treated and washed with cold solvent to remove residual oil from the wax cake. The oil can be separated and recovered from the solvent wash stream and the solvent can be recycled.

The cold oil/solvent filtrate stream is first fed to a heat exchanger to indirectly cool the waxy oil feed and is then fed to the selective permeable membrane for countercurrent contact with the warm waxy oil feed to transfer a significant portion of the solvent from the cold oil/solvent filtrate to the warm waxy oil feed.

The separation and transfer of cold solvent from the oil/solvent filtrate stream to the waxy oil feed achieves a substantial reduction in the amount of solvent that must be separated from the oil/solvent filtrate stream.

The cold oil/solvent filtrate stream, after transfer of cold solvent through the selective membrane into the waxy oil feed, is sent to an oil/solvent separation operation in which the solvent is removed by distillation from the dewaxed oil, cooled and recycled to the dewaxing process and the dewaxed lubricating oil product is recovered.

A substantial portion of the cold solvent in the filtrate stream is transferred through the selective membrane to the warm waxy oil feed to directly cool the waxy oil feed to a temperature near to but above the crystallization temperature of the wax in the waxy oil feed.

ADVANTAGES

Several benefits are obtained by the solvent dewaxing process of the present invention.

The solvent transferred from the filtrate through the selective permeable membrane into the warm waxy oil feed does not have to be either heated in the oil/solvent recovery distillation system to separate the solvent or have to be subsequently cooled prior to recycle to the dewaxing process. More solvent is available to be added to the waxy oil feed since the distillation recovery and/or refrigeration bottlenecks are significantly reduced or eliminated.

The amount of solvent which is made to selectively permeate through the membrane into the waxy oil feed stream is limited only by the size and permeability of the membrane and the hydraulic capacity of the scraped surface, double pipe heat exchanges and the rotary filters. As a result of using a selective permeable membrane to separate and directly recycle cold solvent to the waxy oil feed, the internal solvent circulation rate can be substantially increased and can be larger than the flow rate of the solvent recovered from the oil/solvent distillation recovery operation that is recycled to the dewaxing process in a conventional dewaxing process.

The reduction in the viscosity of the oil/solvent/wax feed to the filter, due to the higher availability of solvent achieved by the present invention, leads to an increase in the maximum feed rate to the filters. The higher solvent/oil ratio also contributes to higher oil yields on the filters and greater filter feed rates for heavy stocks which are generally filter area limited.

The selective removal of solvent from the dewaxed oil/solvent filtrate stream can significantly reduce the distillation capacity required and the cost of removing the remaining solvent in the filtrate stream and reduce the capacity required and cost of subsequently cooling the separated distilled solvent to the dewaxing temperature.

A principal advantage of the use of the selective permeable membrane in accordance with the present invention is that it provides simultaneously the selective separation of cold solvent from the cold oil/solvent filtrate stream, direct cooling of the warm waxy oil feed by the cold solvent, and indirect countercurrent cooling of the warm waxy oil feed by the cold oil/solvent filtrate stream.

BRIEF DESCRIPTION OF THE DRAWING

The FIG. 1 is a schematic process flow diagram showing the solvent dewaxing process of the present invention including a selective permeable membrane for countercurrent contact of the waxy oil feed and filtrate streams, incremental cooling and incremental solvent addition, filtration of wax and recycle of recovered solvent from an oil/solvent recovery operation.

WAXY OIL FEED

Figure 1:
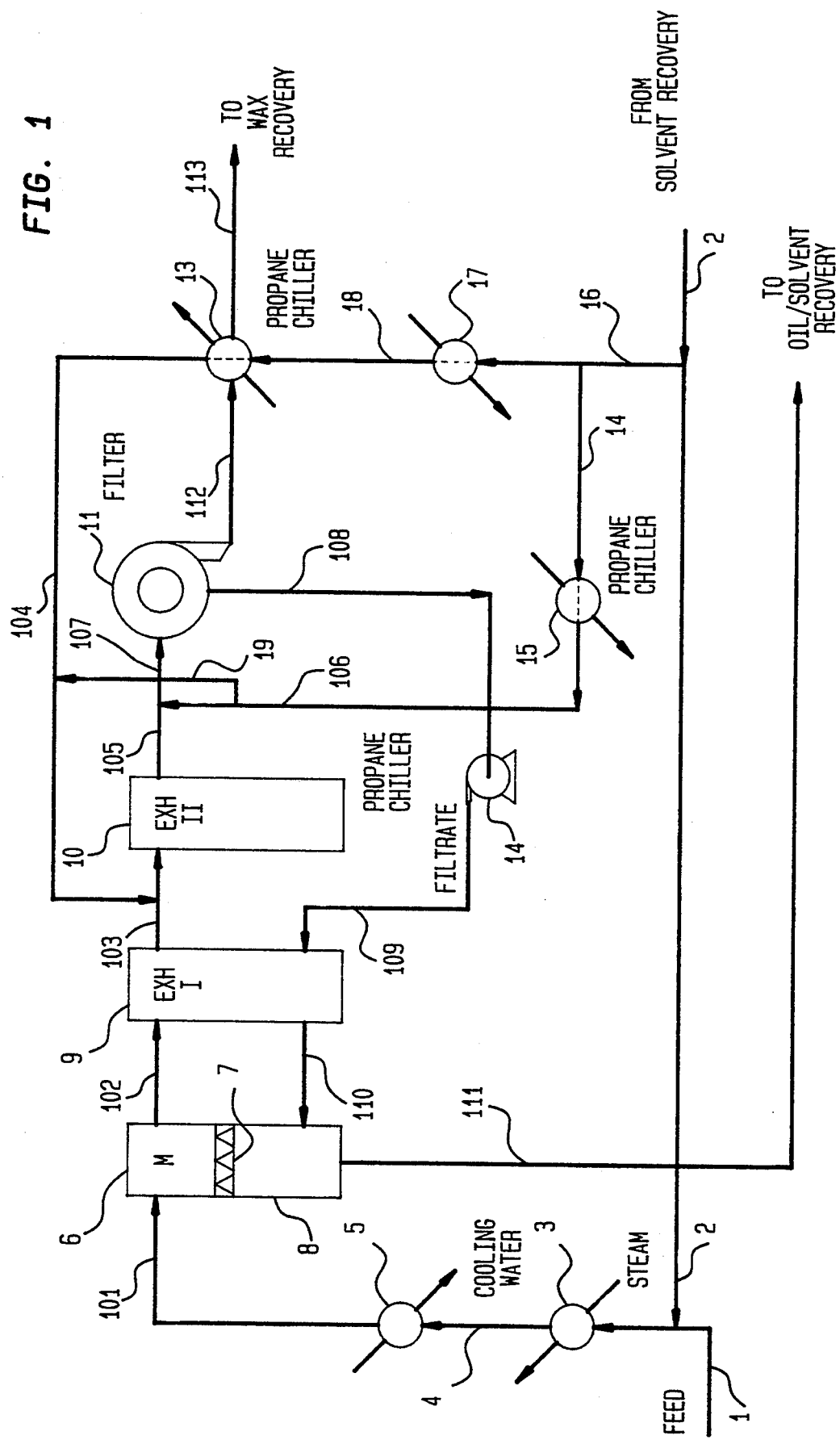

The feed to the process of the present invention can comprise any liquid hydrocarbon containing a dissolved or partially dissolved wax component from which it is desired to remove part or all of the wax component.

The feed to the process of the present invention is typically petroleum lubricating oil raffinates obtained from extraction of distillates and/or deasphalting of vacuum tower distillates.

The waxy oil feed to the process of the present invention is typically waxy lubricating fractions which boil in the range of 580° F. to 1300° F. The fractions boiling from about 580° F. to 850° F. are generally referred to as paraffin distillates. The fractions that boil from about 800° F. to about 1050° F. are generally referred to as heavy lubricating oil distillates. The fractions that boil from about 1050° to about 1300° F. are referred to as residual deasphalted oils.

The distillate lubricating oil feed to the process of the present invention, prior to solvent dewaxing, are treated by solvent-extraction processes to remove aromatic and, if needed, asphaltenic compounds. The aromatic solvent extraction step can be carried out using a conventional phenol or furfural solvent extraction procedure. Deasphalting processes use phenol and/or light hydrocarbon solvents, such as propane or butane. The waxy oil feed to the solvent dewaxing process of the present invention is, accordingly, relatively free of mono and polycyclic aromatic hydrocarbons.

During the dewaxing process the hydrocarbon feed is diluted with a first portion of solvent and then heated to a temperature to effectively dissolve all of the wax present in the feed. The warm feed is then indirectly cooled with cold water by conventional cooling means such as a tubular heat exchanger.

The still warm waxy oil feed is, in accordance with the present invention, then countercurrently contacted with a permeable membrane to selectively transfer cold solvent from a cold oil/solvent filtrate stream through the membrane into the warm waxy oil feed. As the result of this contact, the warm waxy oil feed in this step is cooled and further diluted. The warm waxy oil feed is also simultaneously cooled by indirect heat exchange with the cold oil/solvent filtrate stream that does not permeate through the selective membrane. The extent of solvent transfer, direct and indirect heat exchange are controlled such that the waxy feed mixture exiting the membrane is cooled to a temperature of about its cloud point, but above the temperature at which wax crystals form in solution.

The waxy oil feed is then cooled by indirect heat exchange with cold filtrate and with cold refrigerant and is further cooled and diluted by direct injection of recycle solvent from the recovery operation.

The waxy oil feed in thus sequentially cooled and diluted to its desired wax filtration temperature, which temperature is selected to achieve a desired pour point for the dewaxed oil product.

Typical distillate feeds to the process of this invention are:

|  | Approximate Boiling Range |
|---|---|
| Light Neutral Lubricating Oil Feed Stock | 580–850° F. |
| Heavy Neutral Lubricating Oil Feed Stock | 850–1050° F. |
| Deasphalted Lubricating Oil Feed Stock | 1050–1300° F. |

The term cloud point as used herein is intended to mean the temperature at which wax crystallization begins to occur, and the term pour point is the minimum temperature at which the oil will first move in a standard tube after quickly turning the tube on its side following a standard chilling procedure as set forth in ASTM test method D-97.

Dewaxing Solvent

The dewaxing solvents used in the present invention can be an aliphatic ketone, such as acetone, methyl ethyl-ketone (MEK), diethyl ketone, methyl n-propyl ketone, methyl isopropyl ketone, methyl-n-butyl ketone, methyl isobutyl ketone or other lower aliphatic ketones and mixtures thereof. The solvent also can include an aromatic solvent such as benzene, toluene, xylene and the like. The preferred solvent is a mixture of methyl ethyl ketone and toluene.

The dewaxing solvent used in the present invention performs several important functions. The solvent dilutes the waxy oil feed and dissolves the oil component, cools the oil feed to the dewaxing temperature and lowers the solubility of the wax in the oil, forms a wax precipitate having a crystalline structure that facilitates separation of the wax from the oil and solvent in a filtration step and maintains a desired low viscosity to facilitate handling and processing of the oil/solvent/wax mixture through the heat exchangers and filters used in the process.

The process of the present invention, in a preferred embodiment, employs a mixture of MEK and toluene solvents. The MEK has poor solvent power for wax and relatively good solvency for oil. The toluene is included to increase oil solubility at dewaxing temperatures and to reduce oil solution viscosity to improve its filterability.

The use of solvents with high ketone content is beneficial because it increases filter rates and it reduces the dewaxing temperature differential between filtration temperature and pour point of dewaxed oil.

The volume percent ratio of MEK/toluene can be 25:75 to 100:0, preferably 40:60 to 80:20 and typically about 65:35. The preferred ratios depend on the waxy oil raffinate feed to be dewaxed.

For dewaxing of light neutral lube oil feed stock the ratio of MEK/toluene can be 65:35 to 95:5; for dewaxing heavy neutral lube oil feed stock the ratio of MEK/toluene can be 50:50 to 75:25, and for dewaxing deasphalted lube oil feed stock the ratio of MEK/toluene can be 40:60 to 70:30.

The solvent is added to the waxy oil feed sequentially at a number of injection points in the chilling train. The manner of solvent addition affects crystal size and subsequent filtration rates. Large, well defined crystals result in high filter rates and good washing efficiency with a corresponding high dewaxed oil yield and a low oil content wax product. Small or ill-defined crystals form a cake with resultant poor filtration characteristics which lead to lower dewaxed oil yields, poor wax quality and reduced oil production rates.

All solvent additions made at or below wax crystallization temperature should be made at about the same temperature as the oil/solvent/wax to which it is added to avoid shock chilling which promotes formation of fine, difficult filter crystals.

The table below shows the dilution schedule for a light and a heavy neutral distillate stock.

TABLE 1

| Addition Point(1) | Amount of Diluent Added(2) Solvent Oil Ratio Vol. % | |
|---|---|---|
| | Light Neutral Lubricating Oil Feed Stock(3) | Heavy Neutral Lubricating Oil Feed Stock(4) |
| Primary (Line 2) | 50 | 70 |
| Membrane 7 | 100 | 150 |
| Recycle (Line 104) | 30 | 0 |
| Recycle (Line 106) | 100 | 100 |

(1)See FIG. 1 of drawing.
(2)Solvent addition is based on a 10,000 BD lube dewaxing plant.
(3)Ratio MEK/tol. 75/25
(4)Ratio MEK/tol. 60/40

The solvent is added step-wise during the process in order to maintain the viscosity of the oil/solvent/wax mixture at a desirable low level to facilitate handling and processing of the mixture through the scraped surface double pipe heat exchangers and the filtration of the wax in the filter apparatus.

The total solvent dilution to oil feed ratio will depend to a large extent on the wax content of the feed, the viscosity of the feed and the desired pour point of the dewaxed oil product. The term total solvent to oil dilution ratio as used herein is intended to mean the total volume of the solvent that is added to the initial volume of the oil feed during the dewaxing process.

The total solvent to oil ratio can, accordingly, be 6:1 to 1:1, typically 4:1 to 3:1, depending on the nature and viscosity of the waxy oil feed.

The dewaxing temperature is the temperature at which the oil/solvent/wax mixture is fed to the rotary filter drum and depends primarily on the desired pour point of the dewaxed oil product. Typical dewaxing temperatures for light neutral lubricating stocks are $-10°$ to $0°$ F. and for heavy neutral stocks are $0°$ to $+20°$ F.

Dewaxing Aids

The filterability of oil/solvent/wax mixtures is dependent to a great extent on the size and shape of the wax crystals. Crystals growth can be affected by use of low chilling rates and high solvent concentrations. Dewaxing aids or wax crystal modifiers have been found effective in dewaxing. These can be either nucleating agents that initiate crystal growth or growth modifiers that affect crystal growth. The crystals that are obtained are compact and are more readily separated from the oil. The conventional dewaxing aids can be used in the present process.

APPARATUS

Membrane

In the present invention, a membrane module comprised of either hollow fibers or spiral wound sheets is used to directly transfer cold solvent from the filtrate to the hot waxy oil feed raffinate, and to countercurrently cool the raffinate by indirect contact through the membrane with the cold filtrate. The cold solvent is transferred by a combination of osmotic and hydraulic pressure to the hot raffinate on the low-pressure side of the membrane by imposing countercurrent flow of cold filtrate on the high-pressure side. Simultaneous indirect heat transfer thus also occurs across the membrane. Closer temperature approach than economically feasible in a conventional heat exchanger is possible due to the significantly larger surface area of contact of the membrane. The optimum level of solvent exchange is a function of raffinate viscosity and temperature requirements and membrane area. Utility requirements are reduced and the need for two of the heat exchangers normally present in the conventional plant configuration is eliminated. A substantial synergistic effect is obtained over membrane recovery of solvent from the cold filtrate alone since the hot raffinate increases the effective membrane temperature, thereby improving solvent flux. The present invention allows a significant increase in waxy oil feed rate to a dewaxing plant by debottlenecking the refrigeration and oil recovery sections of the plant.

A preferred membrane module is described as follows:

For the solvent-oil separation of the present invention, the membrane materials that can be used include, but are not limited to isotropic or anisotropic materials constructed from polyethylene, polypropylene, cellulose acetate, polystyrene, silicone rubber, polytetrafluoroethylene, polyimides, or polysilanes. Asymmetric membranes may be prepared by casting a polymer film solution onto a porous polymer necking, followed by solvent evaporation to provide a permselective skin and coagulation/washing. A suitable polyimide, based on 5(6)-amino-1-(4'-aminophenyl)-1,3-trimethylindane, is commercially available as "Matrimid 5218". The membrane can be configured as either a flat sheet (plate and frame), hollow fiber, or spiral wound module. For this application, a spiral wound module is preferred due to its high surface area and lower propensity for fouling. Typical construction of such a module comprises layers of the selected membrane wound upon a perforated metal or solvent resistant tube. The membrane layers would be separated by alternate layers of permeate and retentate spacers sized to provide an acceptable pressure drop from inlet to outlet of typically 2-10 psig. Appropriate adhesives and sealants designed to maintain separate permeate and retentate flow channels and to minimize structural rearrangement upon use complete the construction. Modules of any size can be constructed, but typically are 10 inches in diameter and 48 inches long having 200-300 $ft^2$ surface area. Feed flow to each module varies according to application but is on the order of 8,000-10,000 gal/day; the corresponding permeate rate is on the order of 2,000 gal/day. Typical trans-membrane pressure drop is expected to be about 600 psi. A commercial installation will vary in size with application and specific membrane performance but will typically employ on the order of 500-1000 modules for a lube dewaxing plant.

It is recognized that a multiplicity of membrane modules can be used either in series or in parallel or any combination of multi-stage parallel units within this arrangement.

Selective permeable membranes useful for the present process are disclosed in Pasternak U.S. Pat. No.

4,985,138, Winston, et al. U.S. Pat. No. 4,990,275, Thompson, et al. U.S. Pat. No. 4,368,112 and I-F Wang et al. U.S. Pat. No. 5,067,970. A preferred membrane is disclosed in and W. R. Grace & Co. patent application (Disclosure #018259), filed concurrently herewith by L. S. White et al., entitled "Polyimide Membrane and Process for Separation of Solvents from Lube Oil" granted as U.S. Pat. No. 5,264,166. The above disclosures are incorporated herein by reference.

Scraped-Surface Double Pipe Heat Exchangers

The chilled oil/solvent flows through the scraped-surface double pipe heat exchangers and is cooled by indirect heat exchange with cold filtrate. The wax crystallization begins in the first of two or more such heat exchangers. The cold surface of the heat exchanger is continually scraped to remove crystallized wax and to maintain the wax dispersed in the oil/solvent liquid.

A second type of scraped-surface double pipe heat exchanger that can be used is one in which a vaporizing propane refrigerant is used to cool the waxy oil feed. The oil/solvent liquid is further cooled and additional wax crystallized in the later used heat exchangers. As before, the surfaces of the heat exchanger are continually scraped to remove crystallized wax and to maintain the wax dispersed in the oil/solvent liquid.

Filter

The wax can be separated from the cold oil/solvent/wax mixture by filtration or centrifugation.

The cold oil/solvent/wax mixture flows from the double pipe heat exchangers to an injected dilution solvent step and then to a rotary drum vacuum filter in which a compartmentalized cloth covered drum rotates, partly submerged in enclosed filter cases in which the wax is separated from the oil/solvent liquid.

A wax-free oil/solvent filtrate solution is drawn through the filter cloth to filtrate tanks in which a vacuum which induces filtration is maintained. A wax cake is deposited upon the drum filter cloth during filtration and is washed on the filter cloth continuously and automatically with cold solvent to produce a low oil content wax product.

The wax cake is then removed from the filter cloth and recovered for further processing.

The principal features of the dewaxing process of the present invention are the large amount of solvent that is transferred through the selective permeable membrane directly into the waxy oil feed, the temperature of the cold oil/solvent filtrate from which the solvent is selectively removed and the total volume of dilution solvent to oil, i.e. total solvent/oil ratio available to carry out the dewaxing process.

The amount of solvent that is transferred through the selective permeable membrane to the waxy oil feed from the oil/solvent filtrate represents solvent that does not have to be recovered from the oil/solvent filtrate by distillation and does not have to be subsequently cooled prior to recycle to the dewaxing process, thus resulting in substantial savings in solvent inventory, distillation capacity and refrigeration capacity.

The direct introduction of the cold solvent from the filtrate into the waxy oil feed and the indirect countercurrent cooling by the oil/solvent filtrate through the membrane provides more efficient heat exchange between the filtrate and waxy oil feed than can be obtained by conventional indirect heat exchangers.

The temperature of the oil/solvent/wax mixture feed to the filter is the dewaxing temperature and determines the pour point of the dewaxed oil product.

The solvent performs the functions of diluent, solvent for the oil, coolant and non-solvent for the wax. The solvent is added to the waxy oil feed at different points along the dewaxing process sequence. The total amount of solvent added is referred to herein as the total solvent/oil ratio and is based on the total volume of solvent added to the waxy oil feed during the dewaxing process.

The total solvent to oil dilution ratio can be 6:1 to 1:1 and depends primarily on the type of waxy oil feed and the desired dewaxed oil pour point.

The dewaxing temperature is dependent upon the desired pour point of the dewaxed oil and is typically a few degrees below the pour point, for example, 5° to 10° F. below the pour point. The pour point is also dependent on the type of oil feed.

DETAILED DESCRIPTION OF THE INVENTION

A detailed description of the process of the present invention is given with reference to the FIG. 1 of the drawing. A waxy oil feed after removal of aromatic compounds by convention phenol or furfural extraction is fed through line 1 at a temperature of about 130° to 200° F. and is mixed with MEK/tol. solvent fed through line 2 at a temperature of 100° to 140° F. from the solvent recovery section, not shown. The solvent is added at a volume ratio of 0.5 to 3.0 solvent per part of waxy oil feed. The waxy/oil solvent mixture is fed to heat exchanger 3 and heated by indirect heat exchange to a temperature above the cloud point of the mixture of about 140° to 210° F. to insure that all wax crystals are dissolved and in true solution. The warm oil/solvent mixture is then fed through line 4 to heat exchanger 5 in which it is cooled to a temperature of about 100° to 180° F., and then fed to membrane module M at that temperature. The membrane module M contains a low pressure waxy oil feed side 6 and a high pressure oil/solvent filtrate side 8 with the selective permeable membrane 7 in between. A cold oil/solvent filtrate is fed through line 110 at a temperature of 5° to 65° F. to the membrane module M. The still relatively warm waxy oil feed is directly and indirectly countercurrently contacted with cold oil/solvent in the membrane module M. The membrane 7 allows the cold MEK/tol solvent to selectively permeate through the membrane 7 directly into the relatively warm waxy oil feed. The cold solvent that permeates through the membrane into the waxy oil feed and the indirect cooling cools the waxy oil feed to an outlet (line 102) temperature of 40° to 140° F., e.g. a few degrees above the cloud point of the oil-wax mixture, such that wax crystals do not form in the membrane module M and plug the selective permeable membrane 7. The solvent selectively permeates the membrane in an amount of 0.5 to 2.0 parts by volume per part of waxy oil in the feed. The outlet temperature of the cold filtrate in line 111 is about 40° to 135° F.

About 30 to 70%, typically 40 to 60% and more typically 45–55% by volume of the MEK/tol. solvent in the cold filtrate permeates through the membrane into the waxy oil feed. The removal of cold solvent from the filtrate and the warming of the filtrate by indirect heat exchange through the membrane reduces the amount of solvent needed to be recovered from the oil/solvent filtrate and reduces the amount of heat required to subsequently heat and distill the solvent from the filtrate in the solvent recovery operation, respectively. Moreover, the effective transfer temperature of the permeate is expected to be nearly identical to that of the waxy oil feed at the point of transfer due to the high surface area of the membrane. The temperature equivalency significantly reduces the possibility of shock chilling. Higher oil filtration rates and lower oil-in-wax contents are obtained as a result.

The filtrate side of the membrane is maintained at a positive pressure of about 200–1000 psig and preferably 400–800 psig greater than the pressure of the waxy oil feed side of the membrane to facilitate the transport of solvent from the oil/solvent filtrate side of the membrane to the waxy oil side of the membrane. The waxy oil side of the membrane 7 is typically at 200 to 300 psig, for example at about 250 psig.

The membrane 7 has a large surface area which allows very close internal temperature approach of the waxy oil feed and the oil/solvent filtrate streams within the membrane module, for example, a temperature approach of less than 10° F. and more typically less than 5° F.

The temperature and solvent content of the cooled waxy oil feed stream in line 102 is controlled at a few degrees above the cloud point of the oil feed/solvent mixture to preclude wax precipitation in the membrane 7.

A typical target temperature for the feed in line 102 would be 40°–140° F., depending on the viscosity, grade and wax content of the waxy oil feed.

The cooled waxy oil feed and solvent are fed through line 102 to scraped-surface double pipe heat exchanger 9.

The cooled waxy oil feed is further cooled by indirect heat exchange in heat exchanger 9 against cold filtrate fed to the heat exchanger 9 through line 109. It is in heat exchanger 9 that wax precipitation typically first occurs. The cooled waxy oil feed is withdrawn from exchanger 9 by line 103 and is injected directly with additional cold solvent feed through line 104. The cold solvent is injected through line 104 into line 103 in an amount of 0 to 1.5, e.g. 0.1 to 1.5, parts by volume based on one part of waxy oil feed. The waxy oil feed is then fed through line 103 to direct heat exchanger 10 and is further cooled against vaporizing propane in scraped-surface, double pipe heat exchanger 10 in which additional wax is crystallized from solution. The cooled waxy oil feed is then fed through line 105 and mixed with additional cold solvent injected directly through line 106. The cold solvent is fed through line 106 in an amount of 0 to 0.1, e.g. 0.1 to 1.0, parts by volume per part of waxy oil feed. The final injection of cold solvent through line 106 serves to adjust the solids content of the oil/solvent/wax mixture feed to the filter 11 to 3 to 10 volume percent, in order to facilitate filtration and removal of the wax from the waxy oil/solvent/wax mixture feed to the filter 11. The mixture is then fed through line 107 to the filter 11 and the wax is removed. The temperature at which the oil/solvent/wax mixture is fed to the filter is the dewaxing temperature and can be −30° to +70° F., e.g. −10° to +50° F., and determines the pour point of the dewaxed oil product. The dewaxing temperature will depend on the particular feed and the desired pour point.

If desired, a slipstream 19 from line 106 can be combined with the solvent in line 104 to adjust the solvent temperature prior to injecting the solvent in line 104 into line 103. The remaining solvent in line 106 is injected into line 105 to adjust the solvent dilution and viscosity of the oil/solvent/wax mixture feed prior to feeding the mixture through line 107 to the filter 11. The oil/solvent/wax mixture is then fed to rotary vacuum drum filter 11 in which the wax is separated from the oil and solvent.

One or more filters 11 can be used and they can be arranged in parallel or in a parallel/series combination. A separated wax is removed from the filter through line 112 and is fed to indirect heat exchanger 13 to cool solvent recycled from the solvent recovery operation. The cold filtrate is removed from filter 11 through line 108 and at this point contains a solvent to oil ratio of 15:1 to 3:1 parts by volume and is at a typical temperature of −10° to +50° F. The cold filtrate is increased in pressure by pump 14 and fed through line 109 to indirect heat exchanger 9, in which it is used to indirectly cool waxy oil feed fed through line 102 to the heat exchanger 9. The cold filtrate is then fed through line 110 to the selective permeable membrane module M in which it is directly and indirectly contacted with waxy oil feed fed to module M through line 102.

A substantial portion of the cold solvent selectively permeates through the membrane directly into the waxy oil feed to cool and dilute the feed. The remaining cold filtrate is withdrawn from the membrane module M through line 111 and is sent to an oil/solvent separation and recovery operation, not shown.

The solvent is separated from the oil/solvent filtrate in the oil/solvent recovery operation by heating and removing the solvent by distillation. The separated solvent is recovered and returned through line 2 to the dewaxing process.

A portion of the recovered solvent is fed through line 2 at a temperature of about 100° to 140° F. to be mixed with waxy oil feed fed through line 1. Another portion of the recovered solvent is fed through line 2 to line 16 and into heat exchangers 17 and 13 in which the solvent is cooled to about the dewaxing temperature by indirect heat exchange against cooling water and wax/solvent mixture, respectively. Another portion of the recovered solvent is fed through lines 2, 16 and 14 to heat exchanger 15 in which it is cooled by indirect heat exchange with cold refrigerant, e.g. vaporizing propane, to about the dewaxing temperature and fed through line 106 and injected directly into the oil/solvent/wax mixture filter feed in line 105.

DESCRIPTION OF THE PREFERRED EMBODIMENT

Light Neutral Lubricating Oil Feed Stock

A light lubricating oil feed boiling in the range of 550° to 1000° F., preferably 600° to 900° F. and more preferably 650° to 850° F., is treated to remove aromatic compounds and is pre-diluted with solvent, heated to melt wax crystals and cooled. A MEK/tol. solvent is used at a ratio of MEK/to. of 25:75 to 100:0, preferably 60:40 to 90:10, and more preferably 70:30 to 80:20.

The total solvent to oil dilution ratio is 6:1 to 1:1, preferably 5:1 to 2:1, and more preferably 4:1 to 2:1.

The dewaxing temperature, i.e, the temperature that the oil/solvent/wax mixture is fed to to the filter, is −20° to +70° F., preferably −10° to +30° F., and more preferably −10° to +10° F.

The prediluted feed is fed to the membrane module at a temperature of 100° to 200° F., preferably 130° to 170°

F., and more preferably 100° to 140° F., and is countercurrently contacted with cold filtrate at a temperature of −20° to +100° F., preferably −10° to +70° F., and more preferably −5° to +50° F.

The oil/solvent filtrate from the filter contains a ratio of solvent to oil of 6:1 to 1:1, preferably 4:1 to 2:1.

The effective transfer temperature of the selective membrane during contact of the feed and filtrate streams is −10° to +100° F., preferably 10° to 80° F., and more preferably 30° to 60° F. The effective transfer temperature of the selective membrane is defined as the arithmetic average of the inlet and outlet filtrate streams temperatures.

The filtrate side of the membrane is maintained at a positive pressure relative to the feed side of the membrane of 200 to 1000 psig, preferably 400 to 800 psig, and more preferably 500 to 700 psig. The oil feed side of the membrane is typically maintained at a pressure of 200 to 250 psig.

There is transferred through the membrane 10 to 100 vol. % of the solvent in the filtrate stream, preferably 25 to 75 vol. %, and more preferably 40 to 60 vol. %.

A sufficient amount of solvent is transferred through the membrane to add 0.5 to 3 parts and preferably 1 to 2 parts of solvent per part of feed to the feed.

A dewaxed oil is obtained having a pour point of −20° to +70° F. preferably −10° to 30° F., and more preferably −5° to +10° F.

Heavy Neutral Lubricating Oil Feed Stock

A heavy neutral lubricating oil feed boiling in the range of 700° F. to 1300° F., preferably 800° to 1150° F., and more preferably 750° to 1100° F. is treated to remove aromatic compounds and is pre-diluted with solvent, heated to melt wax crystals and cooled. A MEK/tol. solvent is used at a ratio of MEK/tol. of 25:75 to 100:0, preferably 50:50 to 70:30 and more preferably 55:45 to 65:35.

The total solvent to oil dilution ratio is 6:1 to 1:1, preferably 4:1 to 2:1, and more preferably 4:1 to 3:1.

The dewaxing temperature, i.e, the temperature that the oil/solvent/wax mixture is fed to to the filter, is −20° to 70° F., preferably 0° to 50° F., and more preferably 10° to 20° F.

The prediluted feed is fed to the membrane module at a temperature of 100° to 200° F., preferably 130° to 180° F. and more preferably 140° to 175° F., and is countercurrently contacted with cold filtrate at a temperature of −20° to +100° F., preferably 0° to 80° F., and more preferably 20° to 70° F.

The oil/solvent filtrate from the filter contains a ratio of solvent to oil of 6:1 to 1:1, preferably 5:1 to 2:1 and more preferably 5:1 to 3:1.

The effective transfer temperature of the selective membrane during contact of the feed and filtrate streams is 0° to 120° F., preferably 20° to 100° F., and more preferably 40° to 90° F.

The filtrate side of the membrane is maintained at a positive pressure relative to the feed side of the membrane of 200 to 1000 psig, preferably 400 to 800 psig, and more preferably 500 to 700 psig.

There is transferred through the membrane 10 to 100 vol. % of the solvent in the filtrate stream, preferably 25 to 75 vol. % and more preferably 40 to 60 vol. %.

A sufficient amount of solvent is transferred through the membrane to add 0.5 to 3 parts, and preferably 1 to 2 parts of solvent per part of oil to the feed.

A dewaxed oil is obtained having a pour point of −20° to +70° F., preferably 0° to 30° F., and more preferably 10° to 20° F.

Deasphalted Lubricating Oil Feed Stock

A deasphalted lubricating oil feed boiling in the range of 600° to 2500° F., preferably 900° to 1500° F., and more preferably 950° to 1300° F. is treated to remove aromatic compounds and is prediluted with solvent, heated to melt wax crystals and cooled. A MEK/tol. solvent is used at a ratio of MEK/tol. of 25:75 to 100:0, preferably 45:55 to 70:30 and more preferably 50:50 to 60:40.

The total solvent to oil dilution ratio is 6:1 to 1:1, preferably 5:1 to 2:1, and more preferably 5:1 to 3:1.

The dewaxing temperature, i.e, the temperature that the oil/solvent/wax mixture is fed to to the filter, is −20° to +70° F., preferably 0° to 50° F., and more preferably 10° to 30° F.

The prediluted feed is fed to the membrane module at a temperature of 100° to 210° F., preferably 130° to 190° F., and more preferably 140° to 180° F., and is countercurrently contacted with cold filtrate at a temperature of −20° to +100° F., preferably 0° to 80° F., and more preferably 20° to 70° F.

The oil/solvent filtrate from the filter contains a ratio of solvent to oil of 6:1 to 1:1, preferably 5:1 to 2:1 and more preferably 5:1 to 3:1.

The effective transfer temperature of the selective membrane during contact of the feed and filtrate streams is 0° to 120° F., preferably 20° to 100° F., and more preferably 40° to 90° F.

The filtrate side of the membrane is maintained at a positive pressure relative to the feed side of the membrane of 200 to 1000 psig, preferably 400 to 800 psig, and more preferably 500 to 700 psig.

There is transferred through the membrane 10 to 100 vol. % of the solvent in the filtrate stream, preferably 25 to 75 vol. % and more preferably 40 to 60 vol. %.

A sufficient amount of solvent is transferred through the membrane to add 0.5 to 4 parts, preferably 2 to 3 parts of solvent per part of feed to the feed.

A dewaxed oil is obtained having a pour point of −20° to +70° F., preferably 10° to 40° F., and more preferably 20° to 30° F.

Though the process and economic advantages of the present invention have been described as they apply to solvent lube dewaxing using MEK/toluene solvent, the invention can also be utilized in a similar manner in other solvent dewaxing systems, such as in propane dewaxing.

The dewaxed oil can be used as lubricating oil stock.

The present invention is illustrated by the following Examples.

EXAMPLE 1

A light neutral lubricating oil feed boiling in the range of 650° to 840° F. is treated to remove aromatic compounds and is prediluted with solvent, heated to melt wax crystals and cooled. The waxy oil feed is then fed to the membrane module at a rate of 14,000 barrels a day based on oil feed.

The membrane is incorporated in a spiral wound module having high surface area and low propensity for fouling. The module comprises layers of the membrane wound upon a perforated metal resistant tube. The membrane layers are separated by alternate layers of permeate and retenate spacers sized to provide an acceptable pressure drop from inlet to outlet of about 2 to 10 psig. Adhesives and sealants are used to maintain separate permeate and retenate flow channels. The modules are constructed to be 10 inches in diameter and 48 inches in length and to have a 200 to 300 ft$^2$ surface area. The number of modules used depends on the total membrane unit feed rate and the specific surface area per module. The feed flow to each module is about 8,000 to 10,000 gal/day. The solvent permeate rate for each module is 1,500 to 2,500, e.g. 2,000 gal/day. The solvent consists of a ratio of MEK/tol. of 70:30. The total solvent to oil dilution ratio is 4:1 based on volume.

The dewaxing temperature, i.e., the feed to the filter temperature is −5° F.

The prediluted feed is fed to the membrane module at a temperature of 160° F. and is directly and indirectly contacted with a cold filtrate stream which is fed to the membrane module at a temperature of about 40° F. The filtrate stream is fed to the membrane module at a rate of 50,400 barrels a day of solvent and 10,500 barrels a day of dewaxed oil.

The filtrate stream side of the membrane is maintained at a positive pressure of 800 psig and the oil feed side of the membrane is maintained at about 200 psig. About 25,000 barrels a day of cold solvent is selectively transferred through the membrane into the oil feed side of the membrane.

There is recovered about 10,500 barrels a day of dewaxed oil having a pour point of +5, and 3500 barrels a day of deoiled wax having an oil content of less than 0.5 vol. % oil.

The process of the present invention results in substantial savings in distillation capacity to recover solvent from filtrate and in refrigeration capacity to cool the warmed separated solvent from the solvent/oil recovery operation to the necessary dewaxing temperature. In addition, there are considerable savings in solvent inventory requirements.

In order to illustrate the savings achieved by the practice of the present invention, a comparison is made between the process of the present invention, in which a selective membrane is used, and the prior art process without the selective membrane.

The process of the present invention, as compared to the prior art process to obtain the same level of dewaxing and pour point oil, achieves an about 33% reduction in the amount of required solvent inventory, a 40% reduction in the size and capacity of the oil/solvent recovery section and an about 50% reduction in the heat energy required to carry out solvent recovery as well as an about 45% reduction in the total refrigeration requirements. The total refrigeration requirements include the refrigeration required to cool the feed and crystallize wax from the feed, e.g., the refrigeration needed for the scraped-surface heat exchangers, as well as the refrigeration required to cool the warm distilled solvent from the solvent recovery operation to the dewaxing temperature.

EXAMPLE 2

A heavy neutral lubricating oil feed boiling in the range of 775° to 1050° F. is treated to remove aromatic compounds and is prediluted with solvent, heated to melt wax crystals and cooled. The waxy oil feed is then fed to the membrane module at a rate of 11,000 barrels a day based on oil feed.

The membrane and module are the same as that of Example 1.

The solvent consists of a ratio of MEK/tol. of 65:35. The total solvent to oil dilution ratio is 4:1 based on volume.

The dewaxing temperature, i.e. the feed to the filter temperature, is +10° F.

The prediluted feed is fed to the membrane module at a temperature of about 175° F. and is directly and indirectly contacted with a cold filtrate stream which is fed to the membrane module at a temperature of about 60° F. The filtrate stream is fed to the membrane module at a rate of 50,400 barrels a day of solvent and 8,800 barrels a day of dewaxed oil.

The filtrate stream side of the membrane is maintained at a positive pressure of 800 psig and the oil feed side of the membrane is maintained at about 200 psig. About 20,000 barrels a day of cold solvent is selectively transferred through the membrane into the oil feed side of the membrane.

There is recovered about 8,800 barrels a day of dewaxed oil having a pour point of 20° F., and about 2,200 barrels a day of wax having an oil content of about 1.0 vol. % oil.

The process of the present invention results in substantial savings in distillation capacity to recover solvent from filtrate and refrigeration capacity to cool the warmed separated solvent from the solvent/oil recovery operation to the necessary dewaxing temperature. In addition, there are considerable savings in solvent inventory requirements.

In order to illustrate the savings achieved by the practice of the present invention, a comparison is made between the process of the present invention, in which a selective membrane is used, and prior art process without the selective membrane.

The process of the present invention as compared to the prior art process to obtain the same level of dewaxing and pour point oil, achieves an about 30% reduction in the amount of required solvent inventory, a 5% reduction in the size and capacity of the oil/solvent recovery section and an about 30% reduction in the heat energy required to carry out solvent recovery as well as an about 40% reduction in the total refrigeration requirements.

EXAMPLE 3

A deasphalted lubricating oil feed boiling in the range of 950° to 1240° F. is treated to remove aromatic compounds and is prediluted with solvent, heated to melt wax crystals and cooled. The waxy oil feed is then fed to the membrane module at a rate of 10,000 barrels a day based on oil feed.

The membrane and module are the same as that of Example 1.

The solvent consists of a ratio of MEK/tol. of 50:50. The total solvent to oil dilution ratio is 5.5:1 based on volume.

The dewaxing temperature, i.e. the feed to the filter temperature, is 15° F.

The prediluted feed is fed to the membrane module at a temperature of about 180° F. and is directly and indirectly contacted with a cold filtrate stream which is fed to the membrane module at a temperature of 65° F. The filtrate stream is fed to the membrane module at a rate of 50,400 barrels a day of solvent and 7,800 barrels a day of dewaxed oil.

The filtrate stream side of the membrane is maintained at a positive pressure of 800 psig and the oil feed side of the membrane is maintained at about 200 psig.

About 25,000 barrels a day of cold solvent is selectively transferred through the membrane into the oil feed side of the membrane.

There is recovered about 7,800 barrels a day of dewaxed oil having a pour point of 25° F., about 2100 barrels a day of deoiled wax having an oil content of less than 1.5 vol. % oil.

The process of the present invention results in substantial savings in distillation capacity to recover solvent from filtrate and in refrigeration capacity to cool the warmed separated solvent from the solvent/oil recovery operation to the necessary dewaxing temperature. In addition, there are considerable savings in solvent inventory requirements.

In order to illustrate the savings achieved by the practice of the present invention, a comparison is made between the process of the present invention, in which a selective membrane is used, and the prior art process without the selective membrane.

The process of the present invention, as compared to the prior art process to obtain the same level of dewaxing and pour point oil, achieves an about 30% reduction in the amount of required solvent inventory, a 55% reduction in the size and capacity of the oil/solvent recovery section and an about 30% reduction in the heat energy required to carry out solvent recovery as well as an about 40% reduction in the total refrigeration requirements.

Although the invention has been illustrated by reference to specific embodiments and examples, it will be apparent to those skilled in the art that various changes and modifications may be made which fall within the scope of the invention. The scope of the invention is to be interpreted and construed in accordance with the attached claims.

What is claimed is:

1. A process for solvent dewaxing a waxy oil feed comprising contacting the waxy oil feed at a temperature of 100° to 180° F. with one side of a selective semipermeable membrane, which selectively permeates dewaxing solvent and contacting the other side of the semipermeable membrane with a cold oil/solvent filtrate stream at a temperature of 5° to 65° F., obtained by filtering wax from an oil/solvent/wax feed fed to a wax filter, maintaining the oil/solvent filtrate stream side of the membrane at a positive pressure of 200 to 1000 psig relative to a pressure of 200 to 300 psig on waxy oil feed side of the membrane, selectively transferring 30 to 70% by volume of the solvent from the filtrate side of the membrane to the waxy oil feed side of the membrane to simultaneously separate solvent from the oil/solvent filtrate stream, inject solvent into the waxy oil feed stream, dilute the waxy oil feed stream with solvent and cool the waxy oil feed stream to a temperature of 40° to 140° F., and at the same time to countercurrently cool the waxy oil feed by indirect contact with the cold filtrate, then sequentially indirectly cooling the waxy oil feed in indirect heat exchangers to crystallize and precipitate wax crystals, sequentially directly injecting additional solvent into the waxy oil feed stream to further cool and dilute and to obtain a desired viscosity of the waxy oil feed stream to facilitate handling of the waxy oil feed stream through the process and to facilitate filtering crystallized wax from the waxy oil feed and to obtain the desired pour point of dewaxed oil product, and during the sequential cooling of the waxy oil feed crystallizing and precipitating wax from the waxy oil feed to obtain an oil/solvent/wax mixture at a temperature of −30° to +70° F., feeding the oil/solvent/wax mixture to a filter to remove the wax and obtain an oil/solvent filtrate stream, contacting the oil/solvent filtrate stream at a temperature of 5° to 65° F. with the selective semipermeable membrane in a membrane module to selectively transfer solvent through the membrane to the waxy oil feed, withdrawing the remaining oil/solvent filtrate stream at a temperature of 40° to 135° F. from the membrane module and treating the oil/solvent/filtrate stream to separate the solvent from the oil, and recovering a dewaxed oil product stream, and a deoiled wax product stream and recycling the separated solvent to the dewaxing process.

2. The process of claim 1 wherein the solvent to oil ratio in the filtrate stream is 15:1 to 3:1 based on volume.

3. The process of claim 1 wherein the dewaxing solvent contains methyl ethyl ketone in a ratio to toluene of 25:75 to 100:0 by volume.

4. The process of claim 1 wherein the effective transfer temperature of the membrane is 20° to 100° F.

5. The process of claim 1 wherein the total solvent to oil dilution ratio is 6:1 to 1:1.

6. The process of claim 1 wherein the pour point of the dewaxed oil obtained is −20° to 70° F.

7. The process of claim 1 wherein the waxy oil feed is a light neutral lubricating oil stock having a boiling range of 650° to 850° F.

8. The process of claim 1 wherein the waxy oil feed is a heavy neutral lubricating oil stock having a boiling range of 750° to 1100° F.

9. The process of claim 1 wherein the waxy oil feed is a bright lubricating oil stock having a boiling range of 950° to 1500° F.

10. The process of claim 1 wherein the semipermeable membrane consists essentially of asymmetric polyimide prepared from 5(6)-amino-1-(4'-aminophenyl)-1,3-trimethylindane, is commercially available as "Matrimid 5218."

* * * * *

UNITED STATES PATENT AND TRADEMARK OFFICE
CERTIFICATE OF CORRECTION

PATENT NO. : 5,358,625

DATED : October 25, 1994

INVENTOR(S) : Ronald M. Gould

It is certified that error appears in the above-indentified patent and that said Letters Patent is hereby corrected as shown below:

On the Title page, item [73], delete "e" on Mobile.

Signed and Sealed this

Second Day of May, 1995

Attest:

Attesting Officer

BRUCE LEHMAN

Commissioner of Patents and Trademarks